United States Patent [19]
Roberson et al.

[11] Patent Number: 5,566,341
[45] Date of Patent: Oct. 15, 1996

[54] IMAGE MATRIX PROCESSOR FOR FAST MULTI-DIMENSIONAL COMPUTATIONS

[75] Inventors: George P. Roberson, Tracy; Michael F. Skeate, Livermore, both of Calif.

[73] Assignee: The Regents of the University of California, Oakland, Calif.

[21] Appl. No.: 957,511

[22] Filed: Oct. 5, 1992

[51] Int. Cl.⁶ .................................................. G06T 1/20
[52] U.S. Cl. .......................................... 395/800; 395/775
[58] Field of Search ........................ 370/60; 364/413.16; 395/800, 164

[56] References Cited

U.S. PATENT DOCUMENTS

| | | | |
|---|---|---|---|
| 4,899,334 | 2/1990 | Shimizu | 370/60 |
| 4,942,517 | 7/1990 | Cok | 395/800 |
| 4,979,111 | 12/1990 | Nisaimura | 364/413.16 |
| 5,109,348 | 4/1992 | Pfeiffer et al. | 395/164 |

OTHER PUBLICATIONS

Caquineau, et al.; A processor architecture for the image and volume reconstruction, CEA–IRDI, Division LETI/D.SYS. CENG 85 X Av. des martyrs 38041, Grenoble Cedex France.
Feldkamp, et al.; Practical cone–beam algorithm, J. Opt. Soc. Am., vol. 1, no. 6, Jun., 1984.
Grangeat; 3D Image Reconstruction In Non Destructive–Testing, CEA, D.LETI, Electronics Acquisition Systems Department, presented Mar. 28–29, 1988, at Grenoble France.
Rizo, et al.; Development Of A 3D Cone Beam Tomographic System For NDT Of Ceramics, CEA, D.LETI, presented at Amer. Soc. of Nondestructive Testing Congress, Jul. 25–27, 1989, Seattle (U.S.A.).
Grangeat, Summary of Grangeat's Dissertation by Nicholas J. Dusaussoy, Analyse d'un SYSTEME D'IMAGERIE 3D par reconstruction a partir de radiographies X en geometrie conique, Jul., 1989.
Pountain: The Transputer Strikes Back, Byte, Aug. 1991, pp. 265–275.
TRW LSI Products, Inc.,; Image Manipulation Sequencer, TMC2302, TRW, Inc., 1990, 40G0636 Rev. A–Apr. 1990, La Jolla, California.
Bipolar Integrated Technology, Inc.; B2130/B3130/B4130, Single Chip Floating Point Processors, MKTG–D012A, 1989, Beaverton, Oregon.
Energy & Technology Review, Computerized Tomography, Lawrence Livermore National Laboratory, Nov.–Dec., 1990.

*Primary Examiner*—Kevin J. Teska
*Assistant Examiner*—Dan Fiul
*Attorney, Agent, or Firm*—Henry P. Sartorio; John P. Wooldridge

[57] ABSTRACT

An apparatus for multi-dimensional computation which comprises a computation engine, including a plurality of processing modules. The processing modules are configured in parallel and compute respective contributions to a computed multi-dimensional image of respective two dimensional data sets. A high-speed, parallel access storage system is provided which stores the multi-dimensional data sets, and a switching circuit routes the data among the processing modules in the computation engine and the storage system. A data acquisition port receives the two dimensional data sets representing projections through an image, for reconstruction algorithms such as encountered in computerized tomography. The processing modules include a programmable local host, by which they may be configured to execute a plurality of different types of multi-dimensional algorithms. The processing modules thus include an image manipulation processor, which includes a source cache, a target cache, a coefficient table, and control software for executing image transformation routines using data in the source cache and the coefficient table and loading resulting data in the target cache. The local host processor operates to load the source cache with a two dimensional data set, loads the coefficient table, and transfers resulting data out of the target cache to the storage system, or to another destination.

19 Claims, 8 Drawing Sheets

IMAGE MATRIX PROCESSOR FOR FAST MULTI-DIMENSIONAL COMPUTATIONS

The United States Government has rights in this invention pursuant to Contract No. W-7405-ENG-48 between the U.S. Department of Energy and the University of California, for the operation of Lawrence Livermore National Laboratory.

BACKGROUND OF THE INVENTION

1. Field of the Invention

The present invention relates to specialized computer architectures for accelerating numerical computations associated with three dimensional image or volumetric processing.

2. Description of Related Art

The needs of advanced research in materials development and the advances in display technology have created a market for computer systems which work with 3-D or volume visualization data sets. One prominent 3-D technology is computerized tomography (CT). CT technology can provide Non-destructive evaluation (NDE) data sets that material designers, medical practitioners, and others want. Off-the-shelf arrays of detectors can acquire sets of projections having as many as $2048^2$ projection elements for 3-D image reconstructions having $2048^3$ volume elements (voxels) with enough spatial and contrast resolution to make the calculations important for every voxel. However, the computer resources do not meet the requirements to reconstruct such a large image in a practical time frame (e.g. within 1 day).

Advances in parallel-computer hardware and the availability of fast algorithms have considerably reduced the reconstruction time for CT inspections. However, as the size, data-acquisition speed and image spatial resolutions of volumetric inspections have increased, the processing and analysis of these data sets have become severe bottlenecks. The 3-D (multi-slice or cone-beam) reconstruction process in CT is much more time consuming than similar 2-D processes because of the large amounts of data required. The desired image sizes, $N^3$, can be from $512^3$ to $1024^3$ or greater voxels. This large amount of data puts a severe strain on current computational resources and those readily available off the shelf. For example, a $512^3$ image requires about 500 Mbytes of memory for the volume image (not including memory for 2-D projections) and about 200 hours of processing time on a typical workstation.

Also, there are a variety of technologies within the CT field and from other fields, which require similar processing resources. For instance, cone-beam (3-D) computed tomography utilizes an area detector to collect the information for a complete volume. A set of 2-D projections (radiographs) are acquired and the 2-D data sets can be used to reconstruct directly into a volume (3-D) image. Unfortunately, no one cone-beam reconstruction algorithm has superior performance over the range of cone-beam acquisition modes. It was determined that an ideal reconstructor must be capable of operating with several different types of cone-beam and 2-D reconstruction algorithms. This requirement demands that the reconstructor hardware be general purpose in nature with programmable hardware. Along with the capability to operate on several different types of algorithms, another advantage of a general purpose reconstructor is the ability to accommodate changes in the algorithms at later dates.

An ideal solution for a fast programmable, multiple-algorithm, volume reconstructor is to implement the computationally-intensive portions of the reconstruction algorithms in specialized hardware. However, prior attempts to design such specialized hardware have failed. For instance, Cauquineau, et al., "A Processor Architecture for Image and Volume Reconstruction", published on about the 3rd of Apr., 1990, at the IEEE ICASSP '90 conference in Albuquerque, N.M., discussed the problem. The Cauquineau, et al., article, in fact, proposed an architecture for a "possible" reconstruction module (see, section 4.1 of the article on the third page of the copy provided with the application). However, there is not sufficient detail in the article to enable implementation of the reconstruction module.

Therefore, there is a need for a system which overcomes the computational bottleneck associated with volume visualization type computations. Such system would preferably accommodate a variety of algorithms, and be adaptable to future algorithms.

SUMMARY OF THE INVENTION

The present invention overcomes to a large degree the computational bottleneck associated with volume visualization problems, such as the cone-beam reconstruction problem encountered in computerized tomography. The invention can be characterized as an apparatus for multi-dimensional computation which comprises a computation engine, including a plurality of processing modules. The processing modules are configured in parallel and compute respective contributions to a computed multi-dimensional image of respective two dimensional data sets. A storage system is provided which stores the multi-dimensional data sets and a switching circuit routes the data among the processing modules in the computation engine and the storage system.

When the apparatus is applied for reconstruction algorithms such as encountered in computerized tomography, a data acquisition port which receives the two dimensional data sets representing projections through an object is connected to the switching system.

Also, the processing modules include a programmable local host, by which they may be configured to execute a plurality of different types of multi-dimensional algorithms.

The processing modules thus include an image manipulation processor, which includes a source cache, a target cache, a coefficient lookup table, and control for executing image transformation routines using data in the source cache and the coefficient table and loading resulting data in the target cache. The local host processor operates to load the source cache with a two dimensional data set, loads the coefficient table, and transfers resulting data out of the target cache to the storage system, or to another destination. The local host processor may also include a filter for incoming two dimensional data, or for performing other preliminary manipulations of the data as it is brought into the source cache.

The image manipulation processor in a preferred system includes address generators for the source cache, coefficient table, and target cache. Also, an arithmetic processing unit, such as a floating point multiplier-accumulator, performs operations on data from addressed locations in the source cache and coefficient table, and supplies resulting data to addressed locations in the target cache.

According to another aspect of the invention, the storage system includes a plurality of memory cells with parallel access paths for high speed transfers. For instance, the system could include a parallel transfer disk system, or parallel transfer DRAM system.

In another aspect, a display system may be coupled with the switching system, for generating a displayed image of multi-dimensional data sets stored in the storage system.

The present application is particularly suited to executing a cone-beam image reconstruction algorithm from a plurality of cone-beam projections through an object. In this application, the system includes a data acquisition port coupled to the sensors for the cone-beam projections. The reconstruction engine, storage system, and display system are coupled to the high speed switch which routes data among the elements of the system. The processing modules within the reconstruction system can be adapted to a plurality of different cone-beam reconstruction algorithms as suits the needs of a particular application.

Accordingly, the present invention provides a fast, parallel-architecture computer designed to process simulated or empirical data for such three dimensional volume visualization applications as the cone-beam reconstruction system, and for generating a volumetric image. The system is flexible and much faster than prior art systems.

Other aspects and advantages of the present invention can be seen upon review of the figures, the detailed description, and the claims which follow.

DETAILED DESCRIPTION OF THE PREFERRED EMBODIMENT

Figure 5:
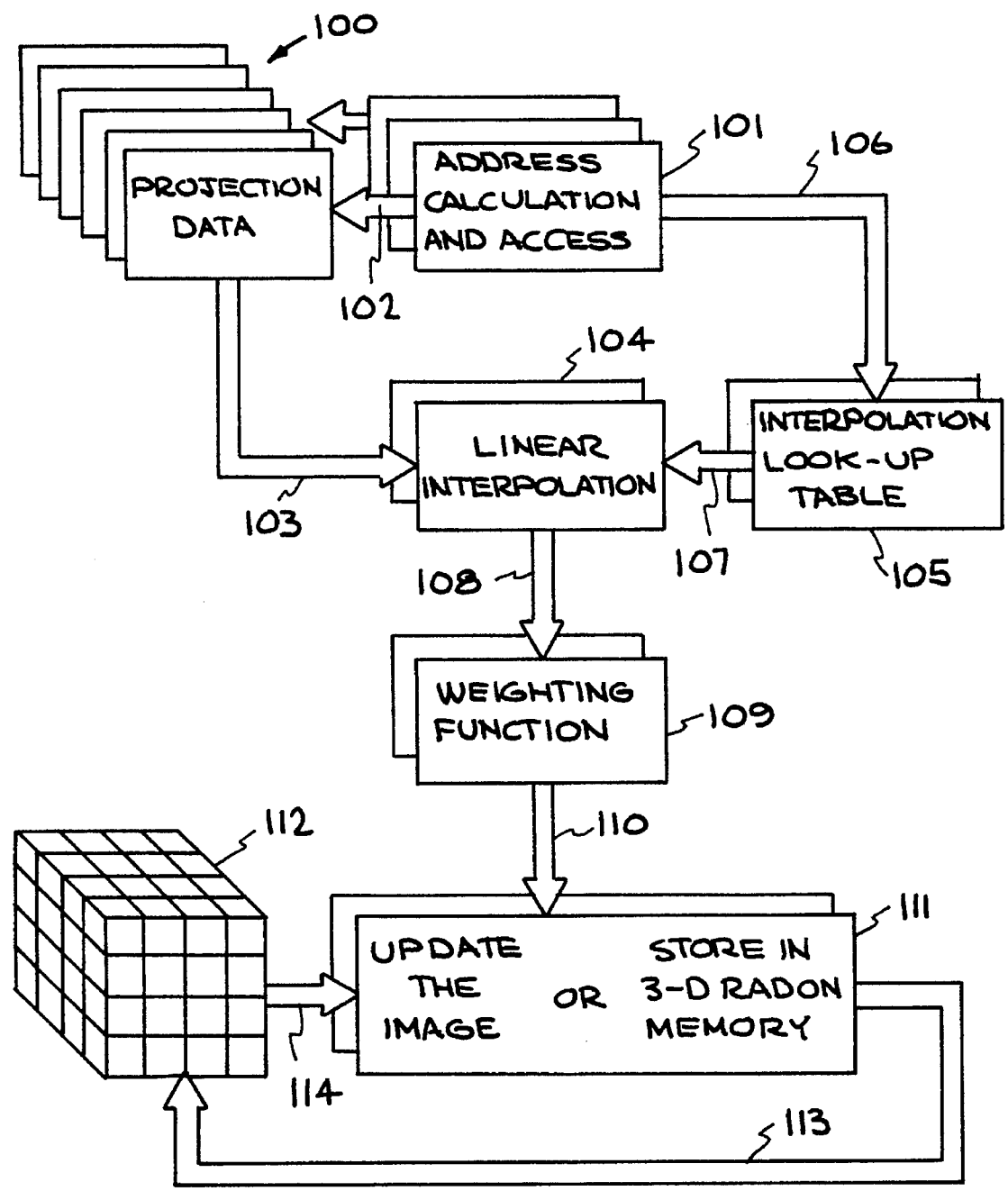
FIG. 5 illustrates the four main calculations involved in the cone-beam reconstruction problem.
Figure 6:
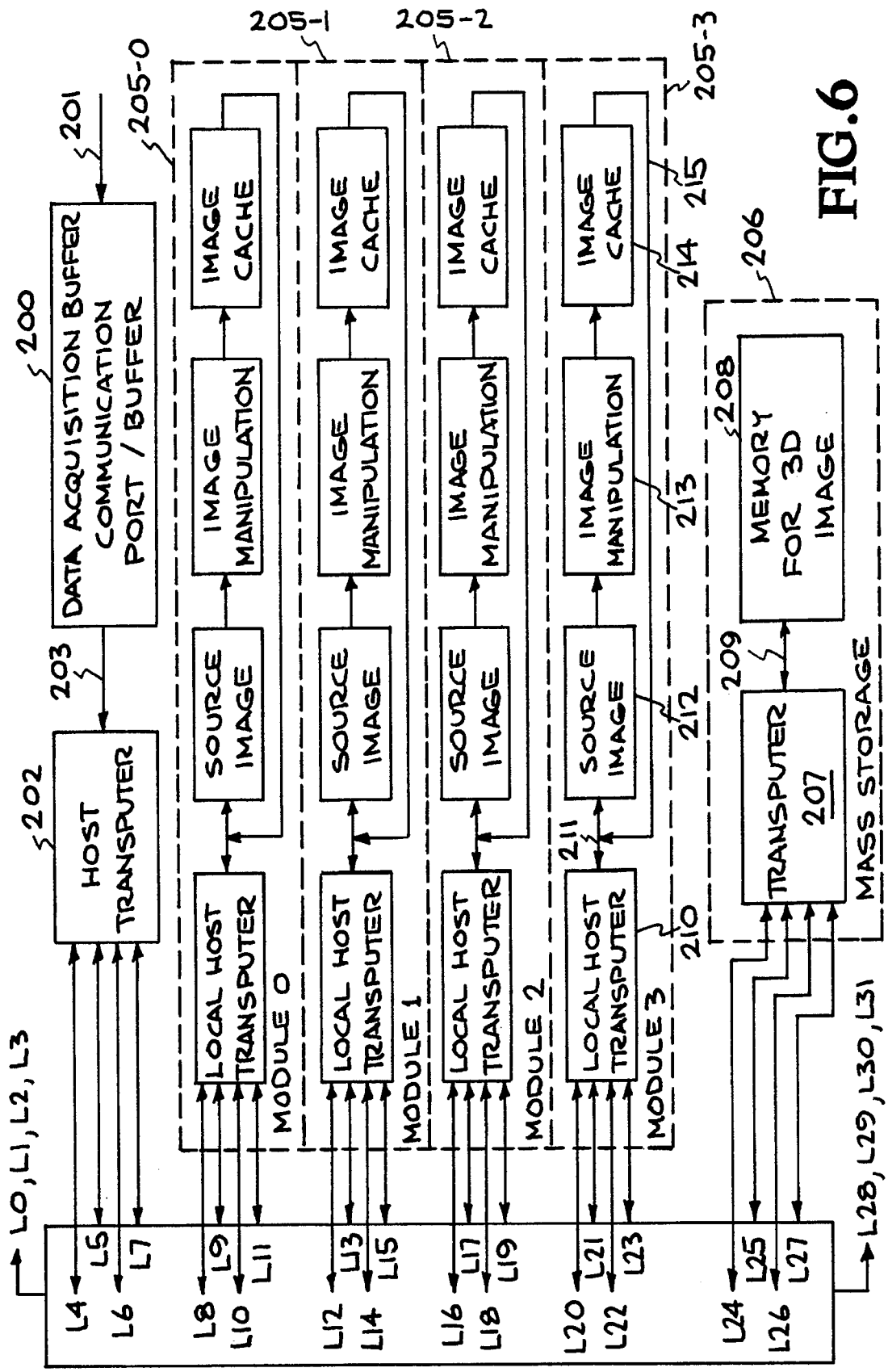
FIG. 6 is a diagram of a preferred implementation of the reconstruction system according to the present invention.
Figure 7:
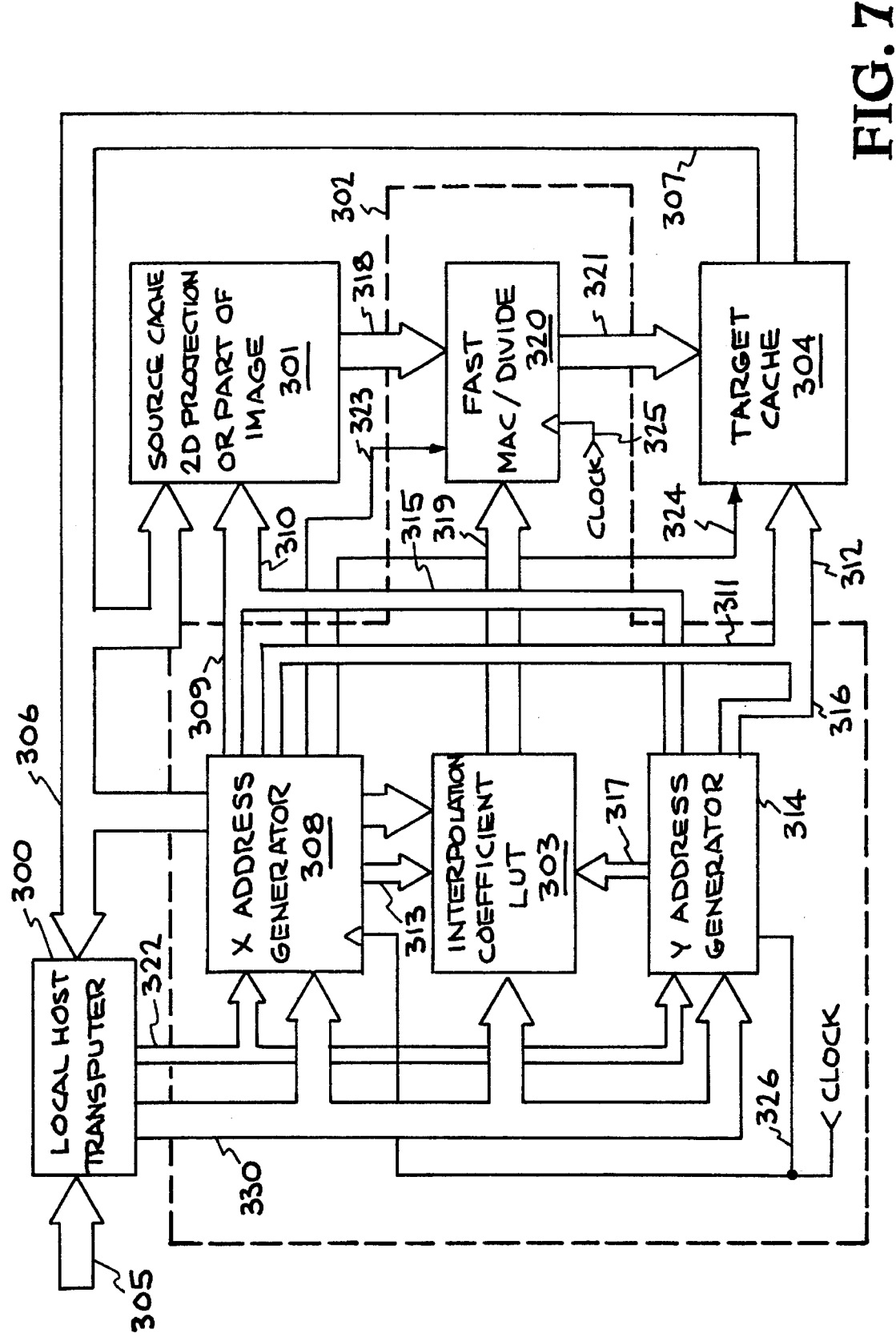
FIG. 7 is a detailed block diagram of the processing module for the system shown in FIG. 6.
Figure 8:
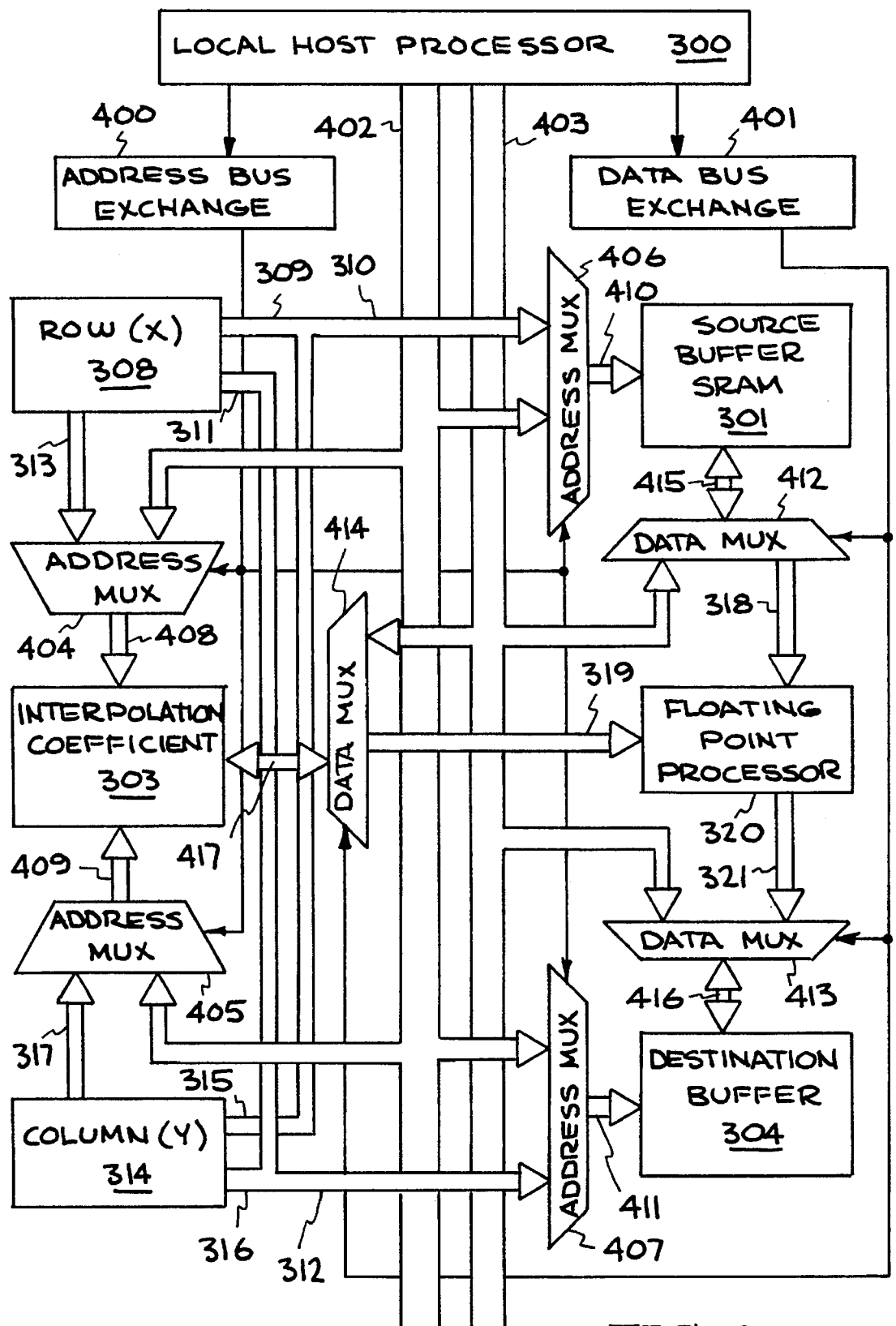
FIG. 8 is a functional diagram of the bus exchange network in the processing module of FIG. 7.
Figure 9A:
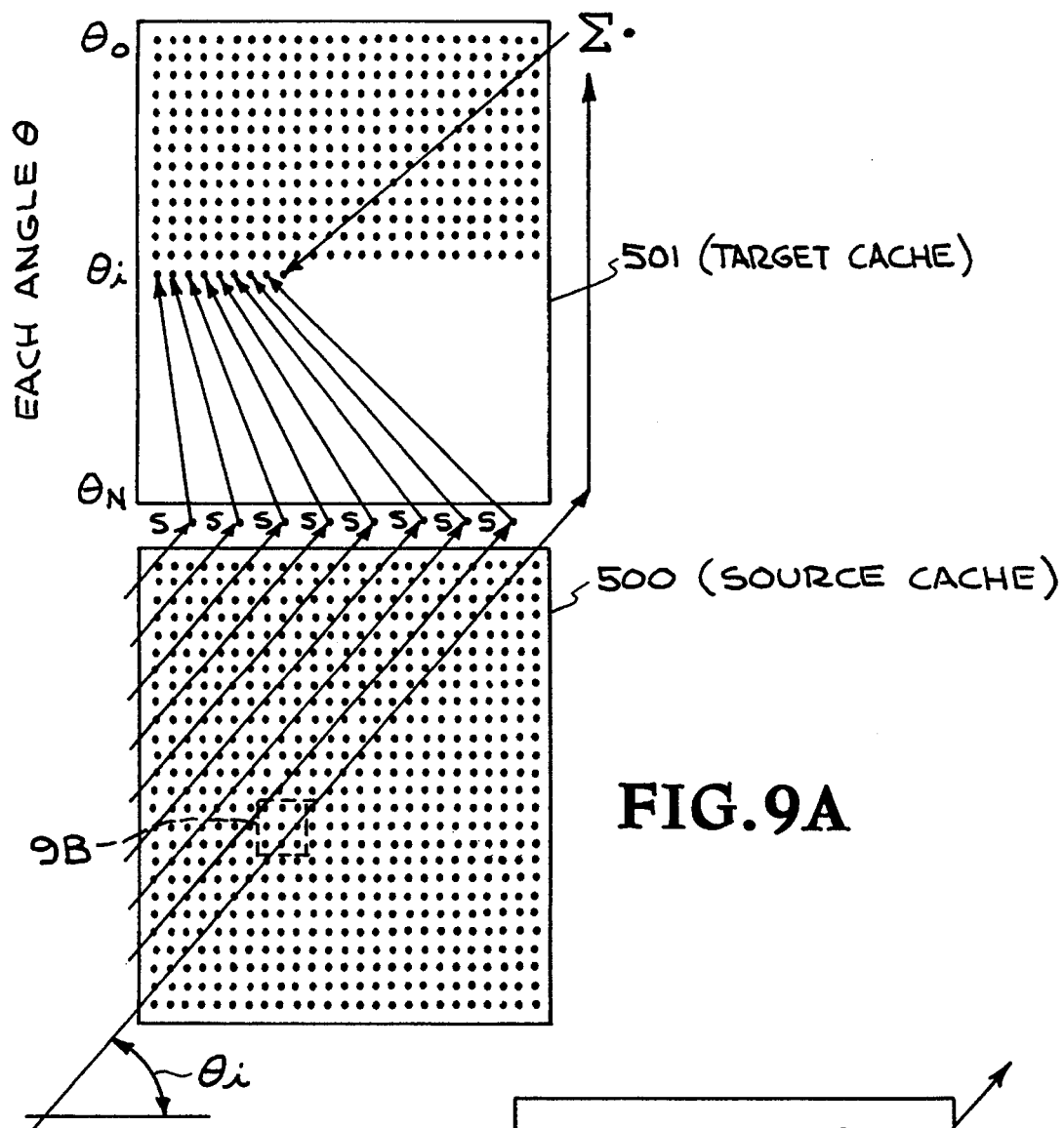
FIG. 9 illustrates the calculation of articulation data points, in one cone-beam reconstruction algorithm.
Figure 9B:
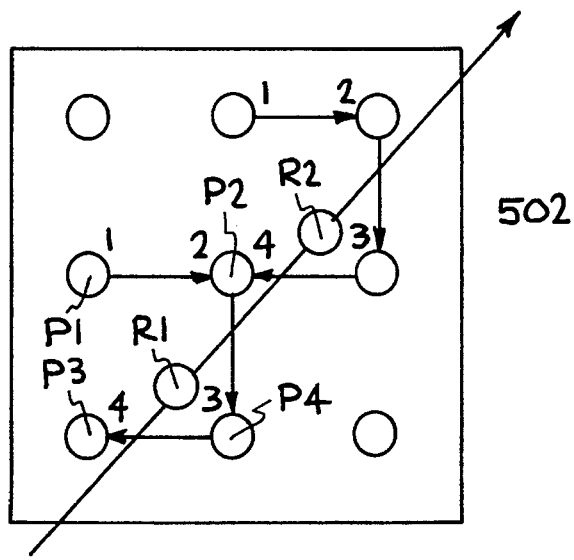

A detailed description of a preferred embodiment of the present invention is provided with reference to FIGS. 1–9. FIGS. 1–5 illustrate the generic application of the invention to the cone-beam reconstruction problem. FIGS. 6–8 illustrate an implementation of a preferred embodiment of the present invention. FIG. 9 illustrates one cone-beam reconstruction process as an aid for understanding the present invention.

Figure 1:
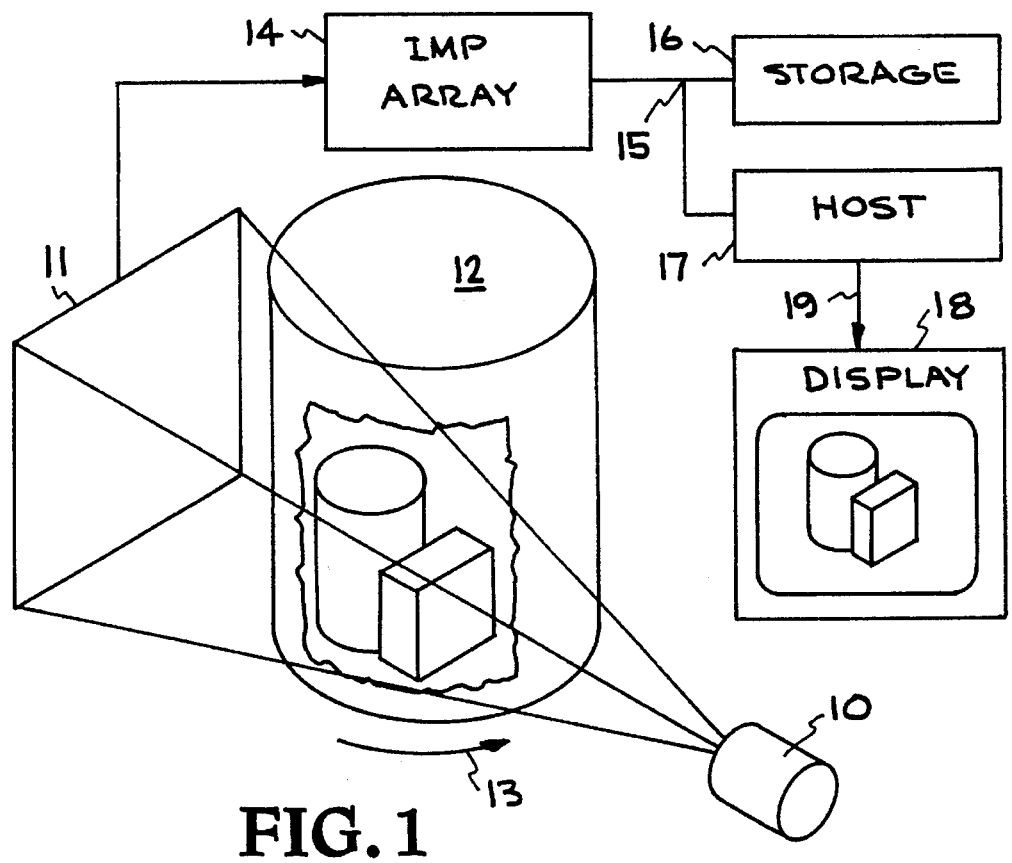
FIG. 1 is a schematic block diagram of a cone-beam reconstruction system according to the present invention.

FIG. 1 illustrates the cone-beam reconstruction problem and provides an overview block diagram of the present invention. As can be seen, a cone beam system involves an X-ray source 10, and an array detector 11. An object 12 is placed between the X-ray source 10 and the array detector 11. The X-ray source illuminates a "cone" through the object 12, and the array detector 11 gathers a two dimensional projection of the X-ray source through the object 12. The object 12 is mounted on a turntable as illustrated schematically by arrow 13. Thus, a set of projections is collected using the array detector 11 as the object 12 is rotated on the turntable 13. The projections are provided to a reconstruction engine 14 which includes an array of image matrix processors (IMP) as described in more detail below. The reconstruction engine 14 is coupled to a high volume, routing bus 15. The bus 15 is also connected to a storage system 16 and a host computer system 17. The host computer system drives a display system 18 across line 19 which results in the display of a complete volume detected from within the object 12.

Figure 2:
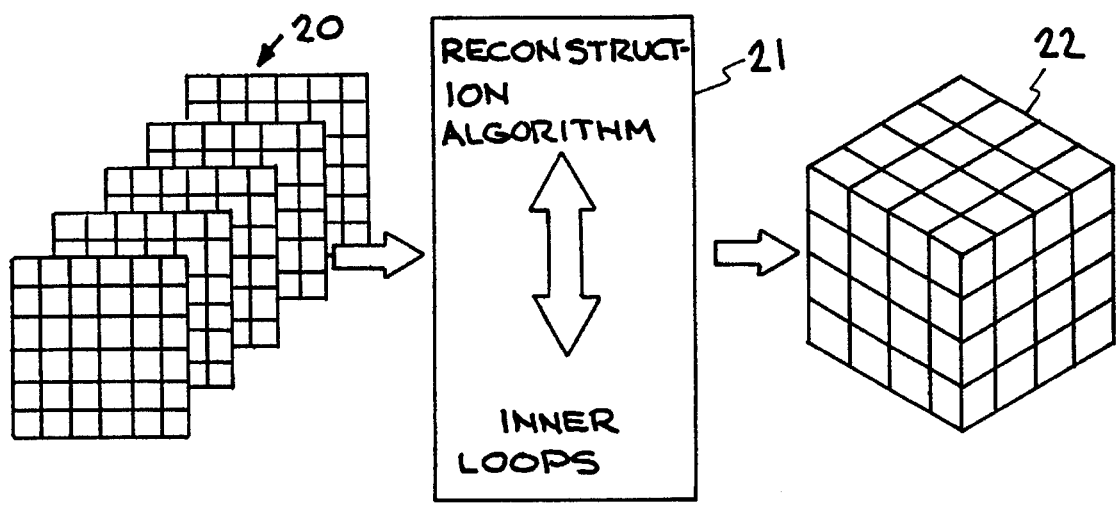
FIG. 2 is a conceptual diagram of the reconstruction process for a generic volume visualization problem.

Thus, the reconstruction algorithm can be characterized as shown in FIG. 2. A set of two dimensional projection data sets, generally 20, is gathered into the system. A reconstruction algorithm 21 is executed which includes a plurality of inner loops, as described below. Upon completion of the reconstruction algorithm, a three dimensional or volume image 22 is developed in the storage 16. Using the volume image 22, the host 17 can compose volume visualizations for display on the display system 18 using techniques known in the art.

Figure 3:
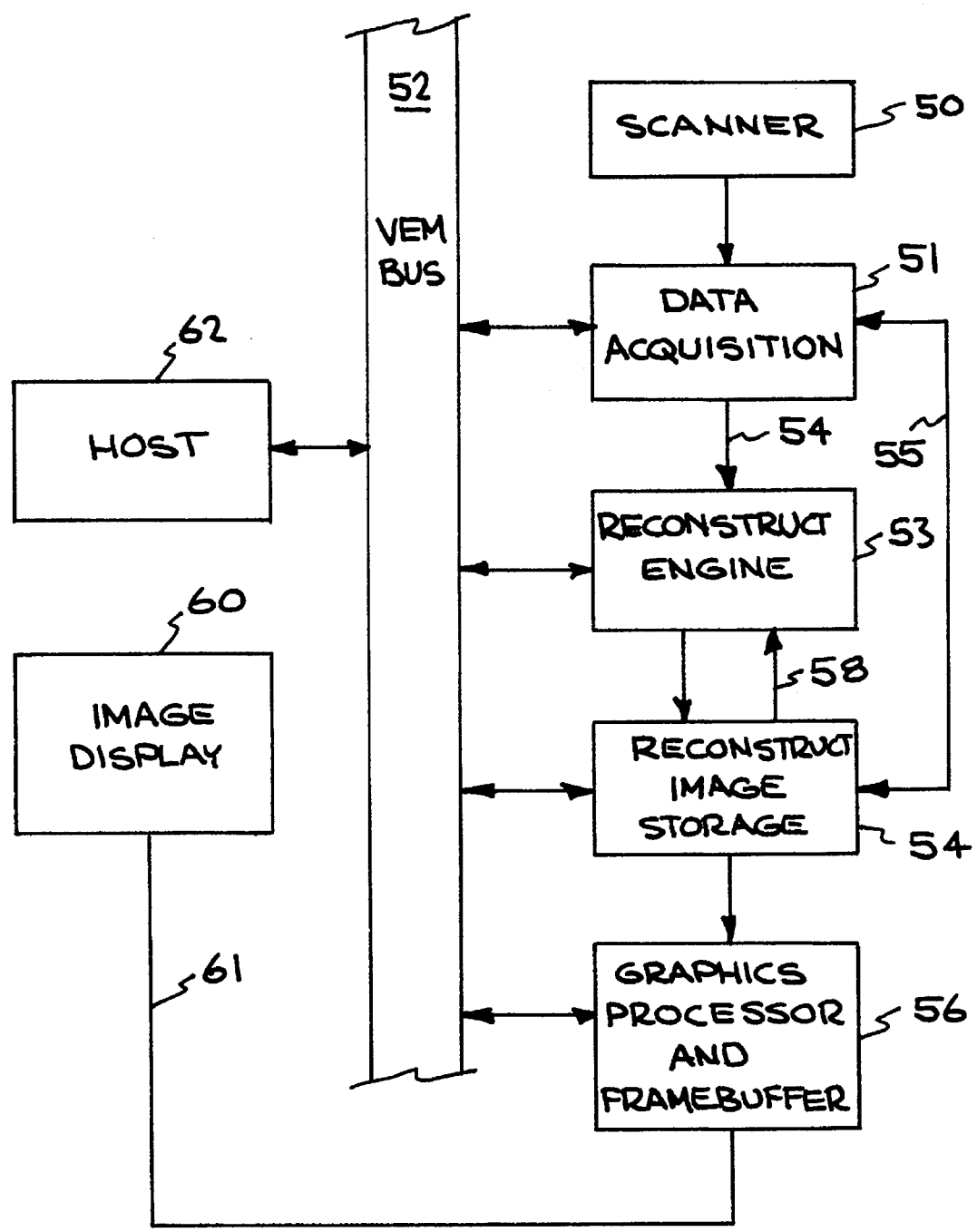
FIG. 3 is a more detailed block diagram of a reconstruction system for a cone-beam CT environment.
Figure 4:
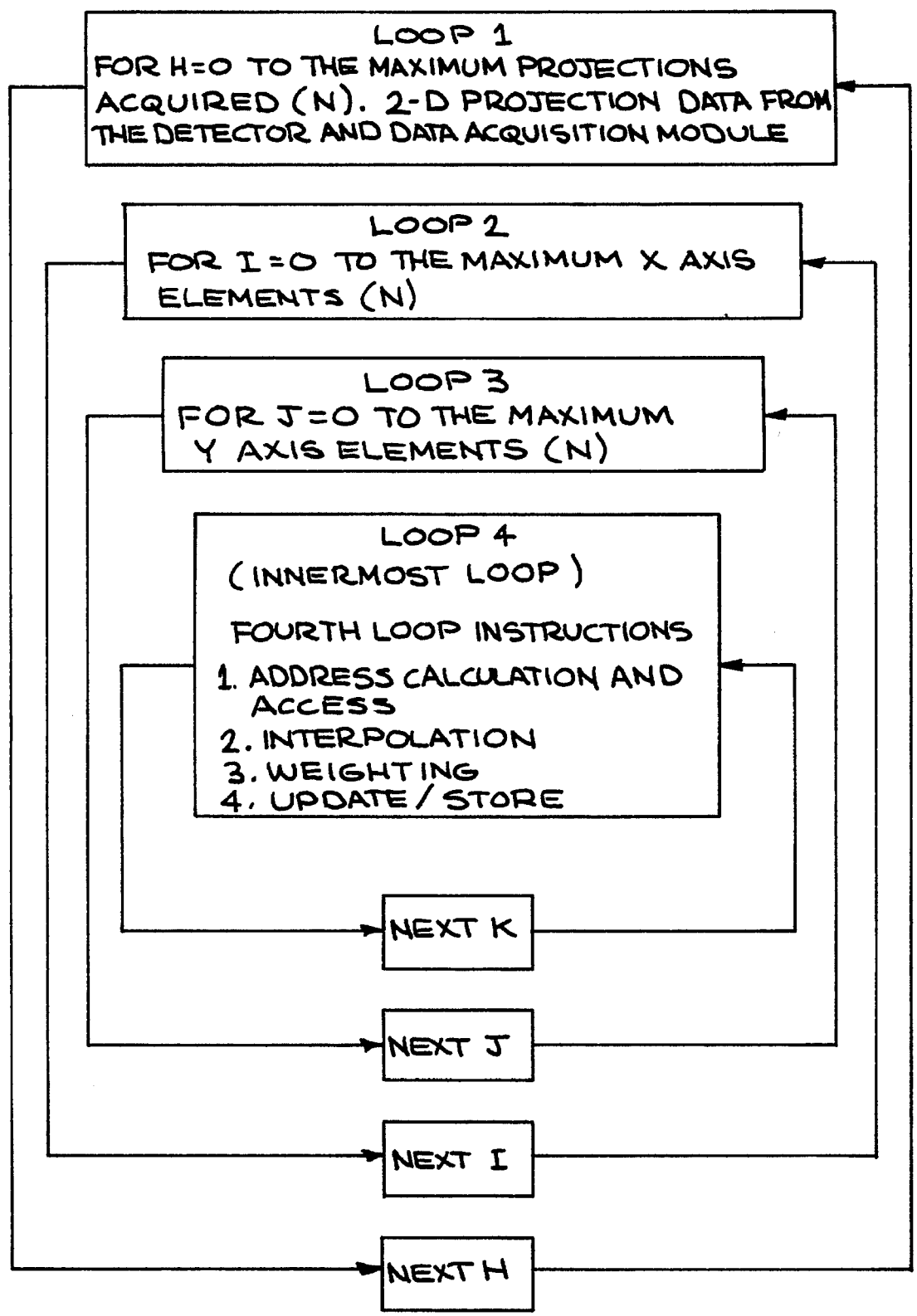
FIG. 4 is a logical diagram of four nested loops that are common to a plurality of cone-beam reconstruction routines.

Thus, FIG. 3 provides a block diagram of the overall computer system environment, including the reconstructor engine based on an array of image matrix processors, the storage system, and the host system. Also included is the data acquisition port.

Thus, a cone-beam reconstruction system may include a cone-beam scanner 50, coupled to a data acquisition card 51. Data acquisition card is coupled to a host system bus 52. The host system bus 52 is also coupled to a reconstructor engine 53 and a reconstructor image storage system 54. Further, a graphics processor and frame buffer 56 is included in the host system connected to the host bus 52. High speed data paths are provided among the data acquisition card 51, reconstructor engine 53, reconstructor image storage 54, and graphics processor and frame buffer 56. Thus, path 55 between the data acquisition card 51 and reconstructor image storage 54, data path 57 between the data acquisition port and the reconstructor engine 53, the bidirectional data path 58 between the reconstructor engine 53 and the reconstructor image storage 54, and the data path 59 from the reconstructor image storage to the graphics processor and frame buffer 56, are included.

The graphics processor and frame buffer 56 is coupled to an image display system 60 across line 61. A host computer 62 is coupled to the host bus 52. The host system may be a Sun workstation or similar computer system.

As mentioned above, the cone-beam reconstruction problem may be solved using a number of different algorithms primarily based on the work of Feldkamp and Grangeat. See, P. Grangeat, "3-D Image Reconstruction in Non-Destructive-Testing", presented at the "Seminaire Europeen Sur La Tomographie", organized by the Society Intercontrole, 29–28 Mar., 1988, Grenoble, France; Rizo and Grangeat, "Development of a 3-D Cone-Beam Tomographic System for NDT of Ceramics", presented at the American Society of Nondestructive Testing Congress, 25–27 Jul., 1989, Seattle, Wash. Grangeat, Doctoral Thesis "Analysis of a 3-D Imaging Device by Reconstruction From Cone-Beam X-ray Radiographs", (Summary of Grangeat's dissertation, by Nicholas Dusaussoy), July, 1989; Feldkamp, et al, "A Practical Cone-Beam Algorithm", Journal of the Optical Society of America, Vol. 1, No. 6, June, 1984, pp. 612–619.

A common kernel can be extracted from Feldkamp, planar and pfbp subroutines published by Grangeat and Feldkamp. These subroutines are characterized by a set of nested loops. The depth of the nested loops depend on the number of dimensions in the reconstructed image. For example, the Feldkamp, planar, and pfbp subroutines have four-nested loops in one or more locations, as summarized in FIG. 4. H, I, J and K are incrementing integers for the nested loops. The outermost loop increments on the integer H, once for each projection in the set of projections acquired on a particular image. Second loop increments on the integer I for computation of each element along the X axis of the volume being reconstructed. The third loop increments on the integer J for each value along the Y axis of the reconstructed volume.

The fourth or "innermost" loop on the dimension K contains the most repeated instructions. This is the computational bottleneck for the cone-beam algorithms. Typically, the set of instructions in the fourth loop are repeated $N^4$ times for a reconstructed CT volume image containing $N^3$ pixels. The goal of the inner-most loop for Feldkamp and pfbp is to calculate the contribution of a particular projection to the volume image at each pixel location and add this contribution to the value already at this location (initially 0). For planar, the goal of the inner-most loop is to compute a set of articulation points by summing along parallel lines drawn across each projection over many angles, as recognized in the Cauquineau paper cited above. Within the innermost loop of all three subroutines there are four main processes necessary to perform these tasks: (1) an address calculation and access; (2) interpolation; (3) weighting; and (4) updating/store. The address calculation determines the coordinates of a location in the object space. This location is the intercept of rays that are from the source, through the object to the detector. This calculation includes a time consuming boundary check. The interpolation process requires the neighboring pixels to the previous computed address. These values are used to perform either a nearest; neighbor approximation or a more accurate, but time consuming linear interpolation. The weighting process determines the contribution for a particular pixel using a simple multiplication. For Feldkamp and pfbp, the update/store process adds this contribution to the value of the current pixel in the image space. For planar, the update/store process simply writes this contribution to the 3-D radon space storage. General purpose microprocessors do not perform these operations efficiently and require hundreds of time consuming commands to complete. Implementing these operations in special hardware of the present invention can reduce them to an equivalent of four or five general purpose microprocessor commands, reducing the time to complete by a factor of 100 or better.

FIG. 5 is a block diagram of the four main calculations involved in the cone-beam reconstruction algorithm which can be carried out in parallel. The projection data comes in as a plurality of 2-D projection data sets 100. Each projection data set is processed with an address calculation and accessing module 101. Module 101 generates an address on line 102. Resulting data from the projection data set is supplied on line 103 to a linear interpolation module 104. An interpolation lookup table 105 also receives an address from the address calculation and access unit 101 across line 106. The addressed coefficient from the lookup table 105 is supplied on line 107 to the linear interpolation module 104. The resulting data is supplied on line 108 to a weighting function module 109. The result of the weighting function module supplied on line 110 to a final module 111 which either updates the image for the Feldkamp or pfbp algorithms, or stores the data in 3-D radon memory for the planar algorithm.

For the Feldkamp and pfbp algorithms to support the updating path 114 is provided by which the module 111 reads the next voxel to be updated. The voxel just updated is replaced in a storage system 112 across line 113 which stores a volume image.

For the planar algorithm, the contribution to radon space is placed in memory 112 from module 111 across bus 113.

From this detailed study of the computationally-intensive portions of these subroutines, it was determined that the innermost loop can be fixed to some common set of instructions (common kernel) for the chosen cone-beam algorithms. According to the present invention, the operations in the innermost loop are executed with a co-processor capable of performing these calculations at extremely high speeds. The variations in these subroutines occur for the most part outside this innermost loop (performed on the local host processor).

The reconstructor has two main components: the reconstructor engine and mass storage, as shown in FIG. 3. The reconstructor engine uses a host processor and an array of advanced image manipulation co-processors (IMP). The IMP is able to perform the computationally-intensive portions of the cone-beam algorithms at extremely high speeds. Furthermore, the mass storage component of the reconstructor takes advantage of parallel-transfer disks that are available commercially.

A block diagram of the overall design for the reconstructor system is given in FIG. 6. The reconstructor design goal is to provide processing speed in a cost effective manner. The reconstructor engine consists of a data acquisition communication port/buffer, a host processor, and four (or more) processing modules. A data acquisition communication port/buffer 200 interfaces the reconstructor to a CT scanner by accepting the raw empirical projection data across line 201. A host processor 202 receives data sets across line 203 and provides control for a communication link between the buffer, processing modules, and mass storage. The host processor can be any general purpose microprocessor with sufficient speed; however, in this case an INMOS ® T9000 transputer is used, having four links L0–L3 to a switch 204.

The packet routing switch 204 provides a fast communication link between each transputer in the system even though they are not directly connected. In a preferred system, an IMS C104 packet routing switch manufactured by INMOS is used. The C104 can connect up to 8 transputers with 4 links each (32 links). Any 16 links can be connected to any other 16 links of the C104 and communicate simultaneously. This communication design allows dynamic control of array topology and thus enables the control of load balance with no hardware redesign.

Coupled to the packet routing switch 204 are a plurality of processing modules 205-0, 205-1, 205-2, and 205-3. Each processing module includes four high speed links to the packet routing switch 204. Thus, the packet routing switch 204 includes ports L4 through L7 coupled to the host computer 202, ports L8 through L11 coupled to processing module 0 (205-0), ports L12–L15 coupled to processing module 1 (205-1), ports L16 through L19 coupled to processing module 2 (205-2), ports L20 through L23 coupled to processing module 3 (205-3). Also coupled to the switch through ports L24 to L27 is mass storage system 206. A local host processor 207 implemented using a T9000 transputer provides an interface to a memory system for 3-D images 208 across bus 209.

The switch 204 also includes ports L0 through L3 and ports L28 through L31 providing links to other components in the reconstructor system or for expansion to more than four processing modules for higher performance or larger multi-dimensional processes.

Each processing module, e.g., processing module 3 includes a local host processor 210 coupled across bus 211 to a source image or projection cache 212. The source image or projection cache 212 is coupled to an image manipulation co-processor 213, which is, in turn, coupled to a target image cache 214. Data is fed back to the local host 210 or to the source image projection cache 212 across bus 215. Each of the other processing modules is identically configured.

FIG. 7 illustrates a detailed block diagram of a processing module for the system of FIG. 6. The most complex portion of the reconstructor engine is the processing module. In a preferred embodiment, as shown in FIG. 7, these modules include a local host T9000 processor 300, source cache 301, image manipulation co-processor (IMP) 302, interpolation coefficient lookup table (LUT) 303, and target cache 304. Each transputer has four high-speed, serial-communication links connected to the C104 packet routing switch represented by bus 305.

The local host transputer 300 is responsible for loading the source cache 301 and the interpolation coefficient LUT 303 across bus 306. Further, the local host transputer 300 initializes the X address generator 308, interpolation coefficient lookup table 303, and Y address generator 314 across bus 330. Also, data out of the target cache 304 is provided across bus 307 to the local transputer 300 for connection back to the routing switch.

The image manipulation processor 302 includes an X address generator 308 which generates addresses on lines 309 as a contribution to a source cache address on line 310, an address on line 311 as a contribution to a target cache address on line 312, and an address on line 313 for accessing a coefficient from the lookup table 303.

Similarly, the system includes a Y address generator 314 which generates an address on line 315 for contribution to the source address on line 310, an address on line 316 for contribution to the target address on line 312, and an address on line 317 for supply to the interpolation coefficient lookup table 303.

Data is supplied from the source cache on bus 318 and the lookup table on bus 319 to a fast multiplier-accumulator/divider 320. The fast multiplier-accumulator/divider 320 generates resulting data on bus 321 for supply to the target cache 304.

The local host 300 generates control on bus 322 for controlling the X and Y generators 308 and 314. Also, control signals on line 323 and line 324 from the address generator 308 are used for controlling timing of the fast MAC/divider circuit 320 and the target cache 304. Other control information for the fast MAC/divider 320 is provided using the local host transputer, or other program loading systems as known in the art. The clock is supplied on line 325 to the fast MAC/divider circuit 320, and on line 326 to the address generators.

The T9000 transputers each have four serial bidirectional communication links (bus 305) which can transfer 10 megabytes per second in each direction simultaneously.

Each processing module requires a source and target image cache and an interpolation look up table. The source cache (input bit plane), interpolation coefficient lookup table, and target cache (output bit plane) use fast ($\leq 25$ ns) static random access memory (SRAM). The required sizes of these memory components are set by the final reconstructed image size.

The IMP 302 uses two TRW® TMC2302s, which are high-speed self-sequencing address generators. The TMC2302s support a wide range of image transformations including: image resampling, rotation, rescaling, warping, boundary limits, and filtering. The IMP, with the TRW chips, reduces the multi-instruction innermost loop subroutines into a few simple instructions and enables the reconstructor to speed up the cone-beam reconstruction algorithms by two orders of magnitude over conventional reconstruction hardware. The TMC2302s are capable of transforming either the incoming 2-D projection data, or a single plane of either 3-D Radon space or a 3-D image. The IMP also includes a Bipolar Integrated Technology® (BIT®) single chip floating point processor (B2130) used for a fast multiplier-accumulator (MAC) 320.

FIG. 8 shows the address- and data-bus architecture for the IMP of FIG. 7. Components of FIG. 7 are given the same reference number in FIG. 8. The address- and data-bus exchange circuit keeps the reconstructor design from requiring dual-port memory. Dual-ported SRAM is currently very expensive and hard to design with because each chip can only store a small amount of data compared to non-dual-ported memory.

As shown in FIG. 8, the local host processor 300 controls an address bus exchange logic 400 and a data bus exchange logic 401. Also, the system is coupled to an address bus 402 and a data bus 403.

The address bus exchange circuit 400 controls an address MUX 404 which supplies X addresses on bus 408 to the lookup table 303, and an address MUX 405 which supplies Y addresses on bus 409 to the lookup table 303. Also, the address bus exchange circuit 400 controls an address multiplexer 406 which supplies addresses on bus 410 to the source buffer 301, and an address MUX 407 which supplies addresses on bus 411 to the destination buffer 304. The address bus 402 coupled to the local host processor 300 is connected as an input to each of the four address MUXes, 404, 405, 406, and 407. Also, address MUX 404 receives the address on line 313 from the X address generator 308. Address MUX 405 receives the address on line 317 from the Y address generator 314. Address MUX 406 receives the source address on bus 310, and address MUX 407 receives the destination address on bus 312.

Similarly, the data bus exchange circuit 401 controls three data multiplexers 412, 413, and 414. Each of the three data multiplexers 412, 413, 414 are coupled to the data bus 403. The data multiplexer 412 can supply data either into or read data from the source buffer 301 on bus 415, data into the source buffer 301 is selected from the data bus 403. Data read from the source buffer 301 is supplied on bus 318 to the fast MAC/divider circuit 320.

Data multiplexer 413 selects data for supply on bus 416 to the destination buffer 304 from bus 321 or from the data bus 403. Also, the data multiplexer 413 can supply data from the destination buffer 304 across bus 416 to the data bus 403.

Data multiplexer 414 is coupled to the data bus 403, and to bus 319. Data supplied from the data bus 403 is supplied into the interpolation coefficient lookup table 303 on bus 417. Data from the lookup table 303 is supplied on bus 319 to the processor 320 across bus 417.

The function of an IMP that would be used in a reconstructor capable of reconstructing an image that is $512^3$ pixels in size is described. An IMP design for larger images would require a larger source cache, target cache and interpolation coefficient lookup table. For a $512^3$ reconstruction, the IMP will access a source cache 301 of $2^9$ (512) pixels per dimension (x and y) with the capability of $2^8$ (256) subpixel resolution per dimension. The host loads the source cache 301 through the local-host transputer 300 with either the projection or Radon-space data. The local host transputer 300 loads the TMC2302s 308, 314 with the parameters required for the image transformation, and system configuration and control. The local host 300 relinquishes control of the address and data bus to the IMP through a bus exchange network (FIG. 8) and starts the transformation process. The IMP executes the entire transformation as programmed by continuously computing the target cache addresses 312 (u, v). These addresses are determined line by line in a raster-scan serial sequence; upon completion a "Done" flag is generated and control is given back to the local host 300. For each target-cache address a corresponding remapped source cache is computed (x, y). The source-cache addresses are generated at 40 MHz and the corresponding target-cache addresses appear at $\{40/(k+1)\}$ MHz where k is the interpolation-kernel size.

The TMC2302 supports a wide range of image transformations by implementing a 16-term polynomial. For example, the planar innermost loop (FIG. 4) is a transformation that only needs to implement a second order polynomial of the form x=a+bu, where a and b are user-defined image transformation parameters. The IMP should be able to transpose a $512^2$-pixel image using nearest-neighbor interpolation in ~6.5 milliseconds and is capable of a complete bilinear interpolation of the same size image in ~26 milliseconds. Programmable flags are available to indicate when the source- and target-cache addresses have fallen outside a rectangular-defined boundary. The IMP also utilizes a fast multiplier-accumulator (MAC). The MAC multiplies the source-cache value at a particular address by the appropriate interpolation weight stored in the interpolation-coefficient lookup table and sums the result into the target-cache address (initially set to zero). These multiply and add operations are repeated until the interpolation-kernel size is met, and each interpolated result is either held in the accumulator or summed into that particular target-cache address.

For example, Grangeat's algorithm is based on a 3-D Radon transform which relates a function to its plane integrals. The relationship between the x-ray transform (projection/radiograph) and Radon transform show that for a given position of the source S, it is possible to compute the Radon transform or its derivative for all planes containing S. There are two relationships between the Radon transform and the x-ray transform which relates the function to reconstruct to its line integrals. First, the weighted sums of the x-ray transform are approximately equal to the Radon transform. Second, the derivative of the weighted sums of the x-ray transform is equal to the derivative of the Radon transform. Numerically, the weighted sums of the x-ray transform can be computed using the IMP hardware of the present invention.

The computationally intensive portion of the planar subroutine computes the weighted sums (articulation points) by summing along parallel lines drawn across each projection (radiograph) at some angle θi for i=0 to N, as illustrated in FIG. 9. A set of articulation points are calculated from these sets of lines at different angles around each radiograph, defined by a second order polynomial of the form x=a+bu.

FIG. 9 provides a functional diagram used for the purpose of explaining the computations for Grangeat's planar subroutine. The projection data is stored in source cache 500, where each dot in the cache 500 indicates a multiple bit data word (ray sum). Articulation points computed using the algorithm are stored in the target cache 501. The source cache 500 corresponds to the cache 301 of FIGS. 7 and 8, and the target cache 501 corresponds to the target cache 304 of FIGS. 7 and 8. A blowup image 502 is provided of 9 data points in the source cache 500 to illustrate the computation of the articulation points.

To reconstruct a $512^3$ image, each articulation point requires the summation of equally spaced resampled data ray sum values along a line. For example, at θ=0° with respect to FIG. 9, along each parallel horizontal line the sum is completed over 512 ray sum values. For a given angle θi, as shown in FIG. 9, the new resampled ray sums used for the summation do not necessarily fall on actual pixel locations in the radiograph and will require interpolation. Each ray sum value will require a bilinear interpolation using 4 neighboring data points as shown in the blow up 502. Thus a total of ~$2.75 \times 10^{11}$ calculations are required since there are 512 articulation points per angle, 512 angles per projection, 512 projections and 4 calculations per interpolation. This is the computation intensive portion ("fourth loop") of the planar algorithm. There are data fetches, a bilinear interpolation calculation, out of boundary check and a summation, all performed $N^4$ times in this part of the planer algorithm.

Thus, the calculation includes a first step in which projection data is stored in the source cache 500, each data point in the projection corresponding to a ray sum through the object.

Next, articulation points are derived from the weighted summation of all resampled ray sums along each parallel line in a set, over a plurality of sets of lines at different angles θi.

The resampling is accomplished using a spiral pixel walk around the new ray sum for bilinear interpolation. Thus, the resampled ray sum R1 is equal to (coefficient weight×P1) plus (coefficient weight×P2) plus (coefficient weight×P3) plus (coefficient weight×P4). The articulation point is the summation of all the resampled ray sums along the line.

The articulation points are stored in the target cache in the manner shown in FIG. 9, where each articulation point for a given angle θi can be considered as stored along a given line of the target cache. A plurality of sets of articulation points for each angle results at the end of the calculation in the target cache.

The overall system operation for a volume visualization problem, such as the cone-beam reconstruction, is described with reference to FIG. 6.

When a projection is acquired from the cone-beam CT system, it is first buffered in the data acquisition input section of the system of FIG. 6. When a total of four projections have been acquired (in a system with four processing modules), the data will be transferred from the acquisition buffer 200 to the input cache 212 of the four processing modules 205-0 to 205-3. Each processing module receives one of four projections via one of the four serial communication links of the local T9000 transputer. This data is transferred simultaneously at 10 MBytes/second on each link (total of 40 MBytes/second). Each projection will contain 500 kBytes of data ($512^2 * 2$ bytes/data point) and will take ~52 ms to transfer to the four modules. This transfer rate is not critical in that each projection will require from 4 to 13 seconds of computation time to compute its contribution to Radon space. However, this transfer rate could be eliminated by buffering incoming data in the processing modules so that transfers can be made of current projections while reconstruction operations are being performed on the previous projections. After the projections are loaded in each processing modules source cache, some precalculations are performed by the T9000 local host 210. The pre-calculations consists of filtering, offset and other artifact removal, and ray-path determination using the Beer's law relationship. The coefficient memory 303 in the IMP 213 is calculated and loaded and the IMP 213 is loaded with control parameters by the local host 210. Also, the local host 210 calculates and loads the transformation polynomial, which in this case consists of a simple line with a slope (a+bu). The transformation polynomial can be reloaded (changed) while the IMP 213 is processing the current set of articulation points. This provides the ability to change the location and slope of the summation line within one machine cycle of the IMP. After this setup procedure is complete, the T9000 local host then relinquishes the address and data bus to the IMP through the bus exchange network and starts the transformation process.

The IMP runs unattended by the local host, calculating the entire set of articulation points for each projection. Equally spaced resampled ray sums from the radiograph are calculated using a bilinear interpolation. For each ray sum calculated, the IMP implements a spiralling pixel resampling algorithm for "walking" around the resampling neighborhood in two dimensions (FIG. 9). The TMC2302 generates the appropriate coefficient memory address and accesses the coefficient weighting value. This value is delivered to the multiplier-accumulator (Bipolar Integrated Technologies B2130). The new resampled ray sum (R1 FIG. 9) is equal to the sum of the neighborhood pixels after each is multiplied by their coefficient weighting value. The multiplication and addition required for this operation is performed in parallel on the BIT B2130 at a 40 MHz rate. The final value from this interpolation step is held in the multiplier-accumulator and added to the next resampled value calculated along the summation line. When the boundary of the projection is encountered the weighted summation is complete and the value held in the accumulator is stored in the next location of the target cache as an articulation point. This process is then repeated for the next parallel summation line, and at the completion of a set of parallel lines the process continues for the next parallel line set at a new angle. This data is generated for each projection of the CT scan. The ~2.75× $10^{11}$ calculations required for these line summations over all the projections can be performed at a 40 MHz rate, which can further be increased by operating more than four IMPs in parallel.

The reconstructor processing modules are designed to operate on data from a number of sources. Data can come from the data acquisition input buffer (200—FIG. 6), the mass storage 206, other processing modules or from the host computer (workstation). For most operations, the processing modules will typically receive data from either the data acquisition input buffer or the mass storage volume.

The communication network for the reconstructor is capable of dynamic topology. The network is not hard-wired to a single geometric matrix. The network matrix can be programmed for change without making hardware alterations. This is accomplished using the T9000 transputers and the accompanying IMS C104, a T9000 supporting communication peripheral.

The C104 is a packet routing switch on a single chip. The C104 connects 32 links (marked L0–L31 on the C104 in FIG. 1) from 8 transputers to each other via a 32 by 32, non-blocking crossbar switch with sub-microsecond latency. The links operate concurrently and the transfer of a packet of data from one link to another does not affect the data rate for other packets passing between other pairs of links on the same C104 chip. The C104 provides fast communication between transputers that are not directly connected. Each transputer has four serial communication links and each link can transfer 20 MBytes/second bidirectional (10 MBytes/second in each direction).

Data from the T9000 transputers are transmitted through the C104 links as sequences of packets. Each packet contains a header to ensure that packets from different data sets are routed properly. The C104 uses the header information from each packet to determine the link that will be used to output the packet to. This allows the C104 to accept and output packets of arbitrary size. The routing decision of the C104 is made as soon as the header has been received. Larger and more complex networks can be designed by connecting multiple C104s together.

All data that are transferred to the reconstructor processing modules must pass through the C104 packet routing switch. Raw data from a CT scanner can be transferred either to the processing modules or directly to the mass storage media to be reconstructed latter. Typically, the data will be transferred to the processing modules so the reconstruction computations can be performed during the data acquisition process. This is desirable because the data acquisition process includes a time consuming detector integration period that can last 10 seconds or more for each projection (radiograph). The proposed four node (processing module) reconstructor can operate on four projections at a time. It will take at least 40 seconds to acquire four projections and it would be practical to utilize this acquisition time for the reconstruction computations.

CT projection data are received and stored in the data acquisition buffer. This buffer is addressable by the T9000 host transputer 202. This transputer 202 is the system controller that supervises all operations. After four projections are received, the T9000 host 202 transmits the data to each of the four processing modules. The T9000 host 202 transmits each projection data set on one of four links at 10 MBytes/second/link. All four projection data sets are transmitted simultaneously on the four host links at a total rate of 40 MBytes/second. The C104 packet routing switch distributes the data to the correct processing modules. The local host of each processing module receives and loads the data into the source cache of the IMP for processing.

Within the IMP, a transformation of the source cache will be performed. A transformation is a process carried out by the IMP of the processor modules, such as projection rebinning, backprojecting, forwardprojecting, rotating, warping, filtering, etc . . . . The local-host transputer loads the TMC2302s with the parameters required for the image transformation, and system configuration and control. The local host relinquishes control of the address and data bus to the IMP through a bus exchange network and starts the transformation process. The IMP executes the entire transformation as programmed by continuously computing the target cache addresses, (u, v). These addresses are determined line by line in a raster-scan serial sequence; upon completion a "Done" flag is generated and control is given back to the local host. For each target-cache address a corresponding remapped source cache is computed (x, y). The source-cache addresses are generated at 40 MHz and the corresponding target-cache addresses appear at {40/(k+1)} MHz where k is the interpolation-kernel size.

Upon completion, each processing module has the transformation of the projection data located in the target cache.

The four local host transputers transmit the transformation data to the mass storage transputer simultaneously. During this transfer operation, the four local hosts can also receive the new projection data sets from the system host simultaneously. The mass storage transputer loads the transformation data into the mass storage device.

If it is necessary to store the projection data before an image reconstruction, the system host transputer simply transfers the raw data directly to the mass storage transputer over four links at 16–40 MBytes/second, depending on the bandwidth of the mass storage device. After the projection data is stored, the data can be transferred to the processing modules for reconstruction from the mass storage device.

There are cases where the reconstruction or volume visualization algorithms will require that data be accessed from the mass storage device as part of the transformation process. The Feldkamp algorithm is an example of a 3-D (cone-beam) reconstruction code that has this requirement. For each set of four projections acquired and stored in the source cache of each processing module, the entire volume image that is stored in mass storage must be accessed and updated. Another example of accessing mass storage is found in the second phase of the Grangeat cone-beam algorithm. After the transformation and storage of all the projections, this algorithm requires that the volume image is accessed one plane at a time and backprojected. Planes of the transformed projections radon space are delivered to the processing modules and loaded in the source cache for the backprojection process. The backprojection process is simply a variation of an image transformation and is quickly performed on the IMP of the processing modules. After this process, the backprojected data is restored in mass storage as a volume image.

If the volume image in mass storage is to be transformed for a volume visualization problem (i.e., adjust opacity, filter, rotate, expand, warp, create a movie loop, project a radiograph etc . . .) the image will be transferred from mass storage to the processing modules four planes at a time (one plane for each module). After the transformation process the new image planes will be restored in mass storage.

The present invention solves a class of 3-D algorithms that defy implementation on an array processor or other prior art systems. Like the array processor, the IMP increases performance by eliminating the overhead associated with address generation. Instead of indexing 1D vectors, however, the IMP is capable of indexing either a 2-D matrix, or a 3-D volume. In the IMP design, the address sequencer can be programmed to generate complex image addressing patterns in multiple dimensions.

Using the system of the present invention, the computation of the Radon Transform for cone-beam reconstruction has been shown to execute over 200 times faster than an equivalent implementation on a digital signal processor. This speed-up is possible because the IMP is capable of computing the addresses of points along the line, and the addresses of its 4 neighbors, in a fraction of the time required by a microprocessor.

Volume visualization and its concerns, including theory, numerical implementation, and 3-D hardware, has become a hotbed for research in the 1990's. Volume visualization hardware and software is being developed to view data from a myriad of different fields. In medical imaging, this includes data obtained using computed tomography, magnetic resonance imaging, and ultrasonography. In biomedical research, volume data is obtained by slicing cells into very thin 2-D specimens, then acquiring an image of each slice with an electron microscope; focusing on successive depth planes of a 3-D specimen with a light microscope, then performing deconvolution to eliminate out-of-focus data; and optically sectioning a 3-D specimen with a confocal microscope.

A 3-D volume visualization system capable of viewing, reconstruction, and processing data sets on the order of 1 GByte or more can be built based on the present invention.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. An apparatus for multi-dimensional computations, comprising:

a computation engine including a plurality of processing modules, the processing modules in the plurality configured in parallel and computing respective contributions to a computed multi-dimensional image of respective two dimensional data sets;

storage means for storing multi-dimensional data sets; and at least one fast packet routing switch coupled to the plurality of processing modules in the computation engine and to the storage means, for routing data among the plurality of processing modules in the computation engine and the storage means, wherein said at least one fast packet routing switch is capable of a dynamic topology wherein any geometric matrix of processors and said processing modules can be attained and there is a direct connection of any said processing module to all other said plurality of processing modules.

2. The apparatus of claim 1, further including:

a data acquisition port, coupled to the switching means, for receiving two dimensional data sets representing two-dimensional tomographic projections through an object.

3. The apparatus of claim 1, wherein the computation engine includes means, coupled with the plurality of processing modules, for configuring the plurality of processing modules to execute a plurality of different types of multi-dimensional algorithms.

4. The apparatus of claim 1, wherein at least one of the processing modules in the plurality comprises:

an image manipulation processor, including a source cache, a target cache, a coefficient table, and control for executing image transformation routines using data in the source cache and the coefficient table, and for loading resulting data in the target cache;

a local host processor including means for loading the source cache with a two-dimensional data set, means for loading the coefficient table with coefficients, and means for transferring the resulting data out of the target cache.

5. The apparatus of claim 4, wherein the means for loading the source cache in the local host processor includes:

means for filtering the two-dimensional data set.

6. The apparatus of claim 4, wherein the image manipulation processor includes:

means, coupled with the source cache, coefficient table and target cache, for generating addresses for the source cache, coefficient table and target cache; and means, coupled with the source cache, coefficient table and target cache, for arithmetic processing of data from addressed locations in the source cache and coefficient table and for supplying resulting data to addressed locations in the target cache.

7. The apparatus of claim 1, wherein the storage means comprises:
   a plurality of memory cells with parallel access paths for high speed data transfers.

8. The apparatus of claim 7, wherein the memory cells comprise independent direct access storage devices.

9. The apparatus of claim 1, further including:
   display means, coupled to the switching means, for displaying an image in response to multi-dimensional data sets in the storage means.

10. A plurality of processing modules for computation of a multi-dimensional image from projection data representing a two dimensional projection, wherein at least one processing module of said plurality of processing modules comprises:
    an image manipulation processor, including a source cache, a target cache, a coefficient table, and control for executing image transformation routines using data in the source cache and the coefficient table, and for loading resulting data in the target cache;
    a local host processor including means for loading the source cache with projection data, means for loading the coefficient table with coefficients, and means for transferring the resulting data out of the target cachet, and
    at least one fast packet routing switch coupled to the plurality of processing modules and to the source cache, for routing data among the plurality of processing modules and the source cache, wherein said at least one fast packet routing switch is capable of a dynamic topology wherein any geometric matrix of processors and said processing modules can be attained and there is a direct connection of any said processing module to all other said plurality of processing modules.

11. The apparatus of claim 10, wherein the means for loading the source cache in the local host processor includes:
    means for filtering the projection data.

12. The apparatus of claim 10, wherein the image manipulation processor includes:
    means, coupled with the source cache, coefficient table and target cache, for generating addresses for the source cache, coefficient table and target cache; and
    means, coupled with the source cache, coefficient table and target cache, for arithmetic processing of data from addressed locations in the source cache and coefficient table and for supplying resulting data to addressed locations in the target cache.

13. The apparatus of claim 10, wherein the image manipulation processor includes:
    addressing means, coupled with the source cache, coefficient table and target cache, for generating addresses for the source cache, coefficient table and target cache; and
    execution means, coupled with the source cache, coefficient table and target cache, for arithmetic processing of data from addressed locations in the source cache and coefficient table and for supplying resulting data to addressed locations in the target cache; and wherein
    the local host processor includes programming means, coupled with the addressing means and the execution means, for configuring the execution means and the addressing means to execute a plurality of different types of multi-dimensional algorithms.

14. An apparatus for executing a cone-beam image reconstruction algorithm from a plurality of cone-beam projections through an object, comprising;
    a data acquisition port for receiving two dimensional projection data;
    a reconstruction engine, coupled to the data acquisition port, including a plurality of processing modules, the processing modules in the plurality configured in parallel and including
    an image manipulation processor, including a source cache, a target cache, a coefficient table, and control for executing programmable image transformation routines using data in the source cache and the coefficient table, and for loading resulting data in the target cache;
    a local host processor including means for loading the source cache with projection data from a respective cone-beam projection, means for loading the coefficient table with coefficients, means for configuring the image manipulation processor, and means for transferring the resulting data out of the target cache to compute respective contributions to a reconstructed image of respective cone-beam projections;
    storage means, coupled to the reconstruction engine, for storing the respective contributions in a data set representing a reconstructed image, including a plurality of memory cells with parallel access paths for high speed data transfers;
    at least one fast packet routing switch coupled to the data acquisition port, the plurality of processing modules in the reconstruction engine, and the storage means, for routing data among the data acquisition port, the plurality of processing modules in the reconstruction engine, and the storage means, wherein said at least one fast packet routing switch is capable of a dynamic topology wherein any geometric matrix of processors and said processing modules can be attained and there is a direct connection of any said processing module to all other said plurality of processing modules; and
    display means, coupled to the switching means, for displaying an image in response to the data set representing the reconstructed image in the storage means.

15. The apparatus of claim 14, wherein the reconstruction engine includes means, coupled with the plurality of processing modules, for configuring the plurality of processing modules to execute a plurality of different types of reconstruction algorithms.

16. The apparatus of claim 14, wherein the means for loading the source cache in the local host processor includes:
    means for filtering the projection data.

17. The apparatus of claim 14, wherein the image manipulation processor includes:
    means, coupled with the source cache, coefficient table and target cache, for generating addresses for the source cache, coefficient table and target cache; and
    means, coupled with the source cache, coefficient table and target cache, for arithmetic processing of data from addressed locations in the source cache and coefficient table and for supplying resulting data to addressed locations in the target cache.

18. The apparatus of claim 14, wherein the local host processors comprise transputers having a plurality of high speed communication ports.

19. The apparatus of claim 14, wherein the memory cells comprise independent direct access storage devices.

* * * * *